(12) United States Patent
Han et al.

(10) Patent No.: US 11,953,595 B2
(45) Date of Patent: Apr. 9, 2024

(54) LIDAR APPARATUS AND LIDAR SYSTEM COMPRISING THE SAME

(71) Applicant: HL Klemove Corp., Incheon (KR)

(72) Inventors: HakGu Han, Namyangju-si (KR);
Hoseok Shin, Suwon-si (KR);
ChulSeung Lee, Pyeongtaek-si (KR);
SeongHee Jeong, Yongin-si (KR);
YunKi Han, Suwon-si (KR)

(73) Assignee: HL KLEMOVE CORP., Incheon (KR)

( * ) Notice: Subject to any disclaimer, the term of this patent is extended or adjusted under 35 U.S.C. 154(b) by 199 days.

(21) Appl. No.: 17/314,122

(22) Filed: May 7, 2021

(65) Prior Publication Data
US 2021/0349212 A1    Nov. 11, 2021

(30) Foreign Application Priority Data

May 8, 2020    (KR) .................. 10-2020-0054868

(51) Int. Cl.
*G01S 7/481*    (2006.01)
*G01S 7/484*    (2006.01)
*G01S 17/04*    (2020.01)

(52) U.S. Cl.
CPC ............ *G01S 17/04* (2020.01); *G01S 7/4813* (2013.01); *G01S 7/4817* (2013.01); *G01S 7/484* (2013.01)

(58) Field of Classification Search
CPC .......... G01S 17/04; G01S 17/87; G01S 17/42; G01S 7/4813; G01S 7/4817; G01S 7/484; G01S 7/4814; G01S 7/4816; G01S 7/4818; G02B 5/0205; G02B 5/08; G02B 13/18

See application file for complete search history.

(56) References Cited

U.S. PATENT DOCUMENTS

| | | | | |
|---|---|---|---|---|
| 2004/0135990 A1* | 7/2004 | Ohtomo | ............... | G01C 15/002 356/4.01 |
| 2004/0233460 A1* | 11/2004 | Ura | ......................... | G01S 17/87 356/601 |
| 2010/0091263 A1* | 4/2010 | Kumagai | ............... | G01S 17/10 356/4.01 |

(Continued)

FOREIGN PATENT DOCUMENTS

| KR | 10-2015-0061330 A | 6/2015 |
|---|---|---|
| KR | 10-2016-0111571 A | 9/2016 |

OTHER PUBLICATIONS

Korean Office Action issued on Jan. 29, 2024, in connection with the Korean Patent Application No. 10-2021-0059313, with it's English translation, 21 pages, citing the above reference(s).

*Primary Examiner* — Jonathan M Hansen
(74) *Attorney, Agent, or Firm* — Hauptman Ham, LLP

(57) ABSTRACT

A lidar apparatus is disclosed. The lidar apparatus according to an exemplary embodiment of the present disclose includes a laser generating source for generating a laser; a fixture fixedly disposed on an installation object; a rotating body disposed to rotate about a rotation axis with respect to the fixture, and provided with a laser transmitting module for transmitting a laser generated by the laser generating source to the outside and a laser receiving module for receiving a laser reflected from an external object; and a light guide unit disposed on the rotation axis to transmit a laser generated by the laser generating source from the fixture to the rotating body.

18 Claims, 13 Drawing Sheets

(56) References Cited

U.S. PATENT DOCUMENTS

| | | | |
|---|---|---|---|
| 2015/0241206 A1* | 8/2015 | Kasai | G01C 3/08 356/601 |
| 2016/0291134 A1 | 10/2016 | Droz et al. | |
| 2019/0277953 A1* | 9/2019 | Li | G01S 7/4814 |

* cited by examiner

LIDAR APPARATUS AND LIDAR SYSTEM COMPRISING THE SAME

CROSS-REFERENCE TO RELATED APPLICATION

This application claims priority to and the benefit of Korean Patent Application No. 10-2020-0054868, filed on May 8, 2020, the disclosure of which is incorporated herein by reference in its entirety.

BACKGROUND

1. Field of the Invention

The present disclosure relates to a lidar apparatus and a lidar system including the same, and more specifically, the present disclosure relates to a lidar apparatus capable of omnidirectional sensing by rotating a rotating body having a laser transmitting module and a laser receiving module about a rotation axis with respect to a fixture, and a lidar system including the same.

2. Discussion of Related Art

Recently, LIDAR (Light Detection And Ranging), which is a laser radar apparatus, has been widely used to detect surrounding terrain or objects in automobiles, mobile robots, or the like.

A lidar apparatus is an apparatus that emits pulsed laser light into the atmosphere and uses a reflector or scatterer thereof to measure distances, objects, atmospheric phenomena, or the like, and it calculates the time of reflected light as a clock pulse. By irradiating laser light to the surrounding area and using the time and intensity of the reflected light which is reflected back from the surrounding object or terrain, the lidar apparatus measures the distance, speed, and shape of the object to be measured, or precisely scans the surrounding object or terrain.

Conventional lidar apparatuses require a laser module with a very high output because it emits a laser with a wide beam width corresponding to the angle of view and acquires the distance to the reflector by simultaneously acquiring reflected light from all directions within the angle of view, and accordingly, there is a problem that the size is large and the price is high.

In addition, most of the lidar apparatuses having a panoramic scanning function are configured such that the entire apparatus including a transmitting optical system and a receiving optical system rotates and operates. However, when the entire apparatus is rotated, the system size becomes much larger, which intensifies the problem of increases in price and power consumption.

Meanwhile, since a lidar apparatus used in a vehicle or the like irradiates a laser towards a person, it is required to secure safety related to the human body, particularly the eyes. One of the tasks related to lidar is to satisfy such safety requirements while minimizing the degradation of detection performance.

RELATED ART DOCUMENTS

Patent Documents (Patent Document 1) Korean Patent Laid-Open No. 10-2015-0061330 "Lidar Sensor System" (published on Jun. 4, 2015)

SUMMARY OF THE INVENTION

The present disclosure is to solve the aforementioned problems of the prior art, and the present disclosure is directed to providing a lidar apparatus and a lidar system capable of 360-degree omnidirectional detection scanning without twisting an optical fiber.

In addition, the present disclosure is also directed to providing a lidar apparatus and a lidar system having improved detection performance as well as excellent safety and economic feasibility.

According to an aspect of the present disclosure, provided is a lidar apparatus, including a laser generating source for generating a laser; a fixture fixedly disposed on an installation object; a rotating body disposed to rotate about a rotation axis with respect to the fixture, and provided with a laser transmitting module for transmitting a laser generated by the laser generating source to the outside and a laser receiving module for receiving a laser reflected from an external object; and a light guide unit disposed on the rotation axis to transmit a laser generated by the laser generating source from the fixture to the rotating body.

In this case, the laser generating source may comprise a fiber laser.

In addition, the laser generating source may generate a laser having a wavelength of 1,500 nm to 1,600 nm.

In addition, the laser transmitting module may include a reflective mirror for converting a vertical laser transmitted in a vertical direction along the rotation axis into a horizontal laser, and a transmission lens for transmitting a horizontal laser whose direction is converted in the reflective mirror to the outside.

In addition, the laser receiving module may include a receiving lens for receiving a laser reflected and returned from the external object, and a detector for condensing and detecting a laser received from the receiving lens.

In addition, the detector may comprise an array detector.

In addition, the detector may comprise a multi-channel array having 16 channels or more.

In addition, a first optical fiber for transmitting a laser generated by the laser generating source towards the light guide unit may be disposed in the fixture, wherein a second optical fiber for transmitting a laser passing through the light guide unit towards the laser transmitting module may be disposed in the rotating body, and wherein the light guide unit may guide a laser output from the first optical fiber to an input of the second optical fiber.

In addition, the light guide unit may include a first coupling lens provided at both ends each with an incident surface for converting an incident laser emitted from an output end of the first optical fiber into parallel light, and an exit surface for condensing the parallel light to emit to an input end of the second optical fiber.

In addition, the first coupling lens may be coupled to the fixture to be fixed or coupled to the rotating body to rotate.

In addition, the light guide unit may include a second coupling lens provided with an incident surface and an exit surface at both ends to convert a laser incident from the output end of the first optical fiber into parallel light to emit, and a third coupling lens provided with an incident surface and an exit surface at both ends to condense parallel light incident from the second coupling lens to emit towards the second optical fiber.

In addition, the second coupling lens may be coupled to the fixture to be fixed, and the third coupling lens may be coupled to the rotating body to rotate.

In addition, the second coupling lens and the third coupling lens may be fixed to the fixture.

In addition, a first optical fiber for transmitting a laser generated by the laser generating source towards the light guide unit may be disposed in the fixture, wherein the light guide unit may guide a laser output from the first optical fiber to the laser transmitting module, and wherein a laser passing through the light guide unit may be output towards the laser transmitting module.

In addition, the light guide unit may include a second coupling lens provided with an incident surface and an exit surface at both ends to convert a laser incident from an output end of the first optical fiber into parallel light to emit.

In addition, the second coupling lens may be fixed to the fixture.

In addition, the light guide unit may be fixed to any one of the fixture or the rotating body.

According to another aspect of the present disclosure, provided is a lidar system, including an installation object; a laser generating source fixed on the installation object to generate a laser; a first fixture fixedly disposed on the installation object; a first rotating body disposed to rotate about a rotation axis with respect to the first fixture, and provided with a first laser transmitting module for transmitting a laser generated by the laser generating source to the outside and a first laser receiving module for receiving a laser reflected from an external object; and a first light guide unit disposed on the rotation axis to transmit a laser generated by the laser generating source from the first fixture to the first rotating body.

In this case, the installation object may be a vehicle.

In addition, the lidar system may further include a second fixture spaced apart from the first fixture and fixedly disposed on the installation object; a second rotating body disposed to rotate about a rotation axis with respect to the second fixture, and provided with a second laser transmitting module for transmitting a laser generated by the laser generating source to the outside and a second laser receiving module for receiving a laser reflected from an external object; and a second light guide unit disposed on the rotation axis to transmit a laser generated by the laser generating source from the second fixture to the second rotating body.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which.

DETAILED DESCRIPTION OF EXEMPLARY EMBODIMENTS

Figure 1:
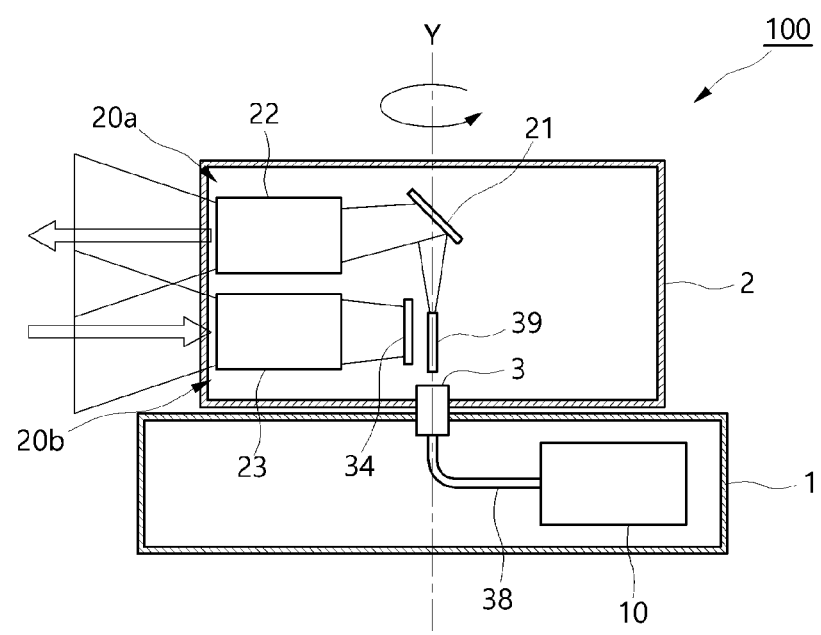
FIG. 1 is a schematic side view of the configuration of a lidar apparatus according to an exemplary embodiment of the present disclosure.

Hereinafter, exemplary embodiments of the present disclosure will be described in detail with reference to the accompanying drawings so that those skilled in the art can easily carry out the embodiments. The exemplary embodiments may, however, be embodied in many different forms and should not be construed as being limited to the embodiments set forth herein. In the accompanying drawings, portions irrelevant to the description of the present disclosure will be omitted for clarity. Moreover, like reference numerals refer to like elements throughout.

It should be further understood that the terms "comprises," "comprising," "includes," "including," and/or "having," when used in this specification, specify the presence of stated features, integers, steps, operations, elements, components, or groups thereof, but do not preclude the presence or addition of one or more other features, integers, steps, operations, elements, components, or groups thereof In the present specification, spatially relative terms such as "front", "rear", "upper", or "lower" may be used to describe the correlations with the constituent elements shown in the drawings. These are relative terms which are determined based on what is shown in the drawings, and the positional relationship may be interpreted in the opposite direction depending on the orientation. In addition, that a constitutional component is "connected" with another constitutional component includes cases that are not only directly connected to each other, but also indirectly connected to each other, unless otherwise specified.

Figure 2:
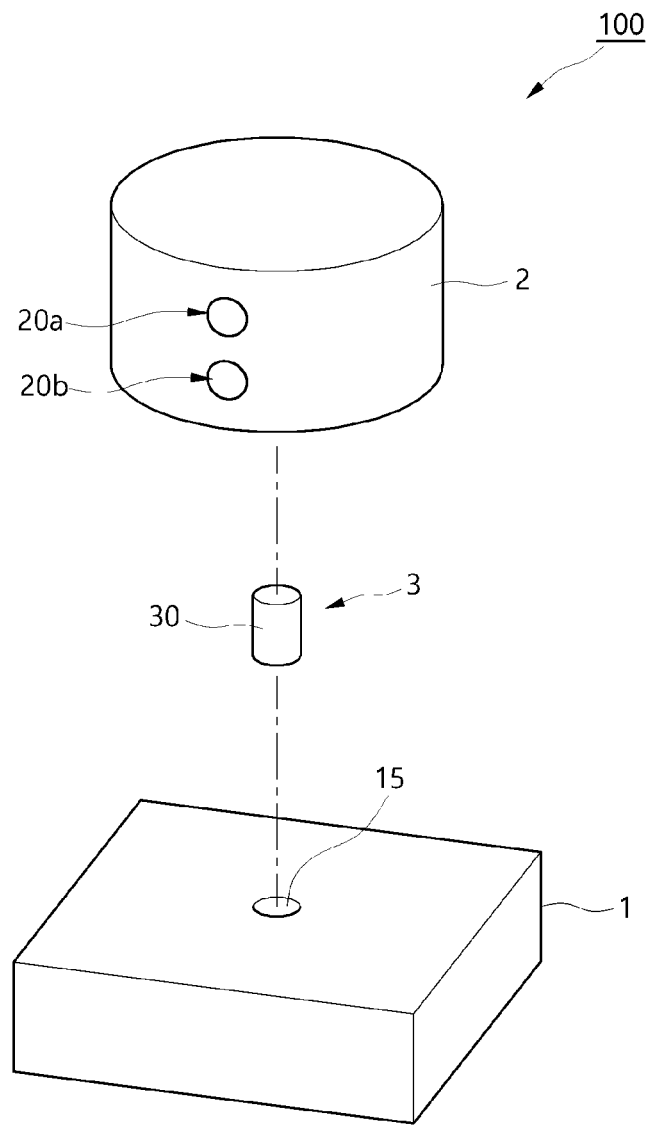
FIG. 2 is an exploded perspective view of a lidar apparatus according to an exemplary embodiment of the present disclosure.

FIG. 1 is a schematic side view of the configuration of a lidar apparatus according to an exemplary embodiment of the present disclosure. FIG. 2 is an exploded perspective view of a lidar apparatus according to an exemplary embodiment of the present disclosure, and FIG. 3 is a schematic plan view of the configuration of a lidar apparatus according to an exemplary embodiment of the present disclosure.

Figure 3:
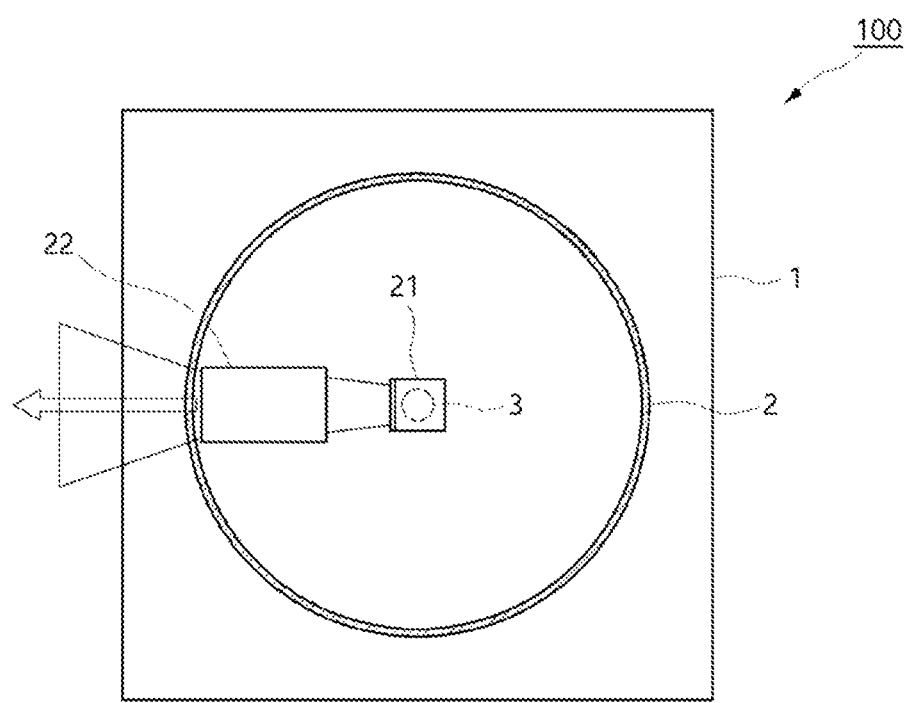
FIG. 3 is a schematic plan view of the configuration of a lidar apparatus according to an exemplary embodiment of the present disclosure.

Referring to FIGS. 1 to 3, the lidar apparatus 100 according to an exemplary embodiment of the present disclosure includes a laser generating source 10, a fixture 1, a rotating body 2, and a light guide unit 3.

The laser generating source 10 generates a laser. Herein, the laser means a laser used to detect an object. The laser generating source 10 may generate a laser having a set intensity when power is applied.

In an exemplary embodiment of the present disclosure, the laser generating source 10 may comprise a fiber laser. The fiber laser has an advantage of being able to generate a high-power light source for proof of the detection distance while satisfying the safety standards for protecting the human eye. For example, the laser generating source 10 may generate a laser having a wavelength of 1,500 nm to 1,600 nm.

However, the laser generating source 10 is not limited to a fiber laser. In some cases, a laser diode or the like may be considered to be used as the laser generating source 10.

In an exemplary embodiment of the present disclosure, the laser generating source 10 may be disposed inside the fixture 1. The laser generated by the laser generating source 10 may be transmitted to the rotating body 2 through the light guide unit 3.

The laser generating source 10 may be installed outside the fixture 1. For example, the laser generating source 10 may be installed on an installation object (e.g., a vehicle) on which the lidar apparatus 100 is installed. In this case, the laser generated by the laser generating source 10 may be transmitted to the fixture 1 through an optical fiber, and may be transmitted from the fixture 1 to the rotating body 2 through the light guide unit 3.

The fixture 1 is fixedly disposed on the installation object. For example, when the lidar apparatus 100 is applied to a vehicle, an installation object on which the fixture 1 is fixedly disposed may be a vehicle.

In an exemplary embodiment of the present disclosure, the fixture 1 is a fixed structure that is fixedly installed on an installation object, and may have an inner space having a predetermined size such that the laser generating source 10 may be disposed at an arbitrary position in the inner space.

In addition, the fixture 1 may be provided with a through hole 15 for advancing a laser at an upper portion such that the laser may proceed towards the rotating body 2 along the rotation axis Y.

The rotating body 2 is arranged to rotate about the rotation axis Y with respect to the fixture 1. The rotating body 2 is a movable structure that is rotatably disposed on the top of the fixture 1 and may be disposed on the top of the fixture 1. In this case, the rotation axis Y may be formed perpendicular to the upper surface of the fixture 1.

In addition, the rotating body 2 may be provided with a through hole for advancing a laser at a lower portion such that the laser may enter the rotating body 2 from the side of the fixture 1 along the rotation axis Y.

The rotating body 2 includes at least one laser transmitting module 20a for receiving a laser generated by the laser generating source 10 and transmitting to the outside, and at least one laser receiving module 20b for receiving a laser which is reflected after a laser emitted from the laser transmitting module 20a hits a person or an external object such as a driving vehicle.

The laser transmitting module 20a may include a reflective mirror 21 for converting a vertical laser transmitted in a vertical direction along the rotation axis Y into a horizontal laser, and a transmission lens 22 for transmitting a horizontal laser whose direction is converted in the reflective mirror 21 to the outside.

The laser receiving module 20b may include a receiving lens 23 for receiving a laser reflected from an external object and returned, and a detector 34 for condensing and detecting a laser received from the receiving lens 23.

In an exemplary embodiment of the present disclosure, the detector 34 may comprise an array detector. For example, the detector 34 may comprise a multi-channel array of 16 channels or more. In addition, depending on the number of channels, the detector 34 may be provided with a multi-channel array of 4 channels or less.

In addition, the detector 34 may have an optical entrance of 1,600 $m^2$ to be suitable for long-distance detection or an optical entrance of 400 $m^2$ to be suitable for short-distance detection.

Meanwhile, in an exemplary embodiment of the present disclosure, the laser transmitting module 20a and the laser receiving module 20b may be disposed adjacent to each other along the rotation axis Y and spaced at a predetermined interval vertically.

The light guide unit 3 is disposed on the rotation axis Y to transmit a laser generated by the laser generating source 10 from the fixture 1 to the rotating body 2. Since the laser is transmitted from the fixture 1 to the rotating body 2 through the light guide unit 3, an optical fiber disposed between the fixture 1 and the rotating body 2 may be omitted, and through this, the rotating body 2 may rotate without a problem of twisting an optical fiber.

In an exemplary embodiment of the present disclosure, the light guide unit 3 may be fixed to any one of a fixture 1, which is a fixed structure, and a rotating body 2, which is a movable structure. More specifically, one end of the light guide unit 3 may be selectively fixed to any one of the fixture 1 and the rotating body 2, and the other end may be disposed to be relatively rotatable to the rest of the structure.

The light guide unit 3 may perform a function of supporting the rotating body 2 to rotate about the rotation axis Y with respect to the fixture 1, and simultaneously, it may perform a function of transmitting a laser generated by the laser generating source 10 to the laser transmitting module 20a.

Figure 4:
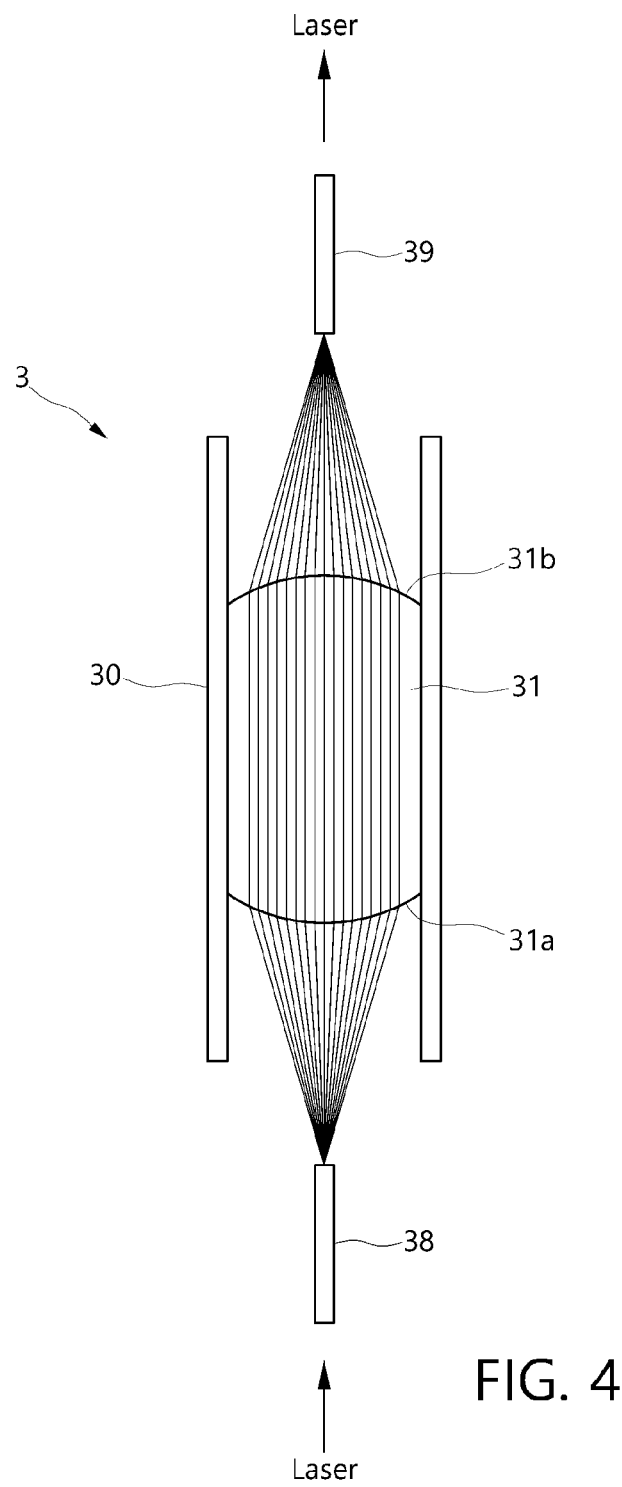
FIG. 4 to FIG. 7 are views showing examples of a light guide unit of a lidar apparatus according to an exemplary embodiment of the present disclosure.

Referring to FIG. 4, a first optical fiber 38 for transmitting a laser generated by a laser generating source 10 to a light guide unit 3 may be disposed in a fixture 1, and a second optical fiber 39 for transmitting a laser passing through a light guide unit 3 towards a laser transmitting module 20a may be disposed in a rotating body 2. The first optical fiber 38 and the second optical fiber 39 transmit a laser generated by the laser generating source 10 to the laser transmitting module 20a while minimizing optical loss.

The first optical fiber 38 is disposed in the inner space of the fixture 1 to transmit a laser generated by the laser generating source 10 to an input end of the light guide unit 3. In addition, the second optical fiber 39 is disposed between an output end of the light guide unit 3 and the reflective mirror 21, which is the input end of the laser transmitting module 20a, to transmit a laser passing through the light guide unit 3 to the reflective mirror 21.

In this case, the light guide portion 3 is disposed between the first optical fiber 38 and the second optical fiber 39. The light guide unit 3 may guide a laser output from the first optical fiber 38 to an input of the second optical fiber 39.

In addition, the light guide unit 3 may include a first coupling lens 31 provided at both ends each with an incident surface 31a for converting an incident laser emitted from an output end of the first optical fiber 38 into parallel light, and an exit surface 31b for condensing the parallel light to emit to an input end of the second optical fiber 39.

The first coupling lens 31 may be coupled to the fixture 1 to be fixed or coupled to the rotating body 2 to rotate.

More specifically, the light guide unit 3 may include a hollow guide member 30. In an exemplary embodiment of the present disclosure, the hollow guide member 30 has one end fixed to the fixture 1 or the rotating body 2 to form a rotation axis when the rotating body 2 rotates with respect to the fixture 1, and it serves as a path for optically guiding a laser generated by the laser generating source 10 towards the laser transmitting module 20a. In this case, the first coupling lens 31 may be inserted into the hollow guide member 30.

For example, the hollow guide member 30 may have an upper end to be relatively rotatably disposed in a through hole, which is penetrated and formed in a lower surface of the rotating body 2, and a lower end thereof may be fixed to an upper surface of the fixture 1. In addition, the hollow guide member 30 may have an upper end fixed to a lower surface of the rotating body 2, and a lower end thereof may be disposed to be relatively rotatable in a through hole 15, which is penetrated and formed in an upper surface of the fixture 1.

Meanwhile, the fixing body 1 and the rotating body 2 may be assembled to each other via an outer surface of the hollow guide member 30 disposed in the through hole and a supporting means such as a bearing means.

Figure 5:
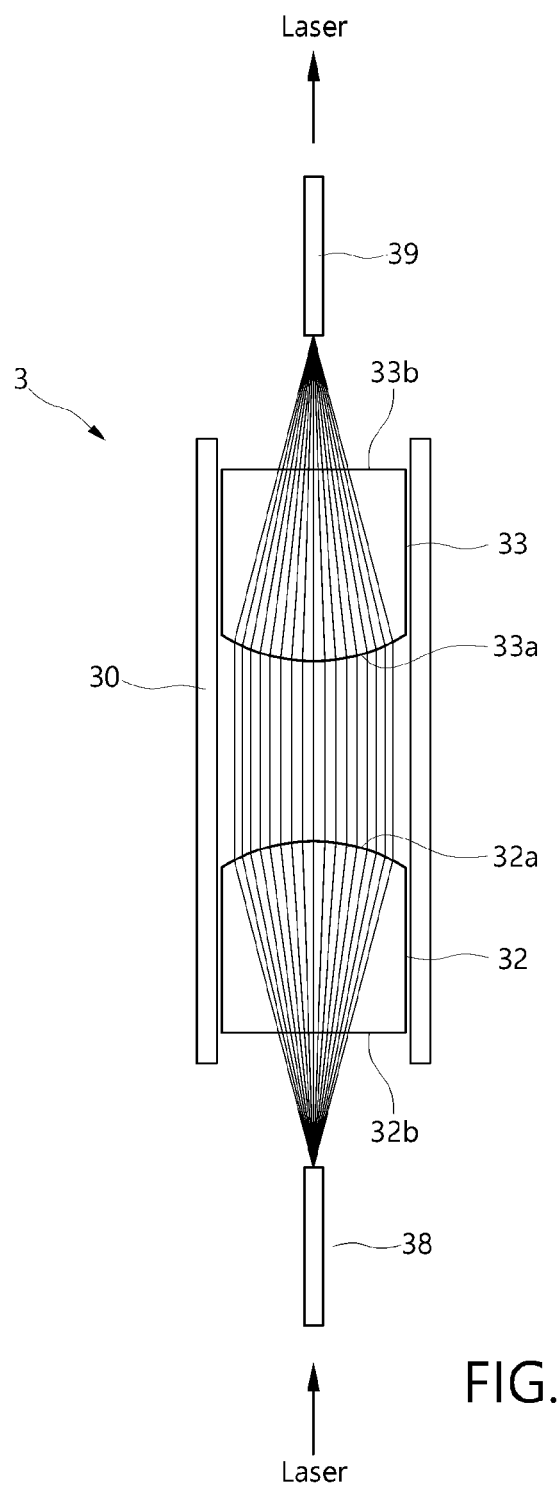

Referring to FIG. 5, the light guide unit 3 may include a second coupling lens 32 provided with an incident surface 32b and an exit surface 32a at both ends to convert a laser incident from an output end of the first optical fiber 38 into parallel light to emit, and a third coupling lens 33 provided with an incident surface 33a and an exit surface 33b at both ends to condense the parallel light incident from the second coupling lens to emit towards the second optical fiber 39.

The second coupling lens 32 and the third coupling lens 33 may be inserted and disposed in the hollow guide member 30 at a predetermined interval at the same time. More specifically, the second coupling lens 32 may be disposed at the lower end (input end) of the hollow guide member 30, and the third coupling lens 33 may be disposed at the upper end (output end) of the hollow guide member 30.

In this case, the second coupling lens 32 and the third coupling lens 33 may be coupled and fixed to the fixture 1. In other words, the hollow guide member 30 into which the second coupling lens 32 and the third coupling lens 33 are inserted may be fixed to the fixture 1.

Certainly, it may be considered that the second coupling lens 32 and the third coupling lens 33 are fixed to the rotating body 2. In this case, the hollow guide member 30 may be fixed to the rotating body 2.

Figure 6:
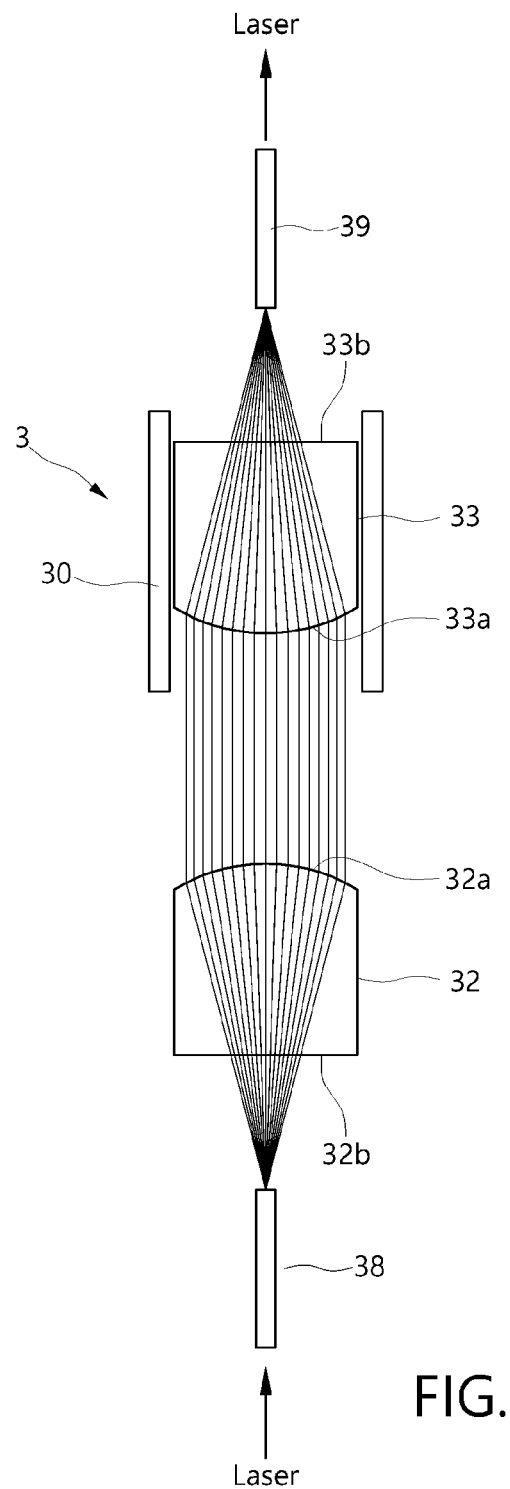
Figure 7:
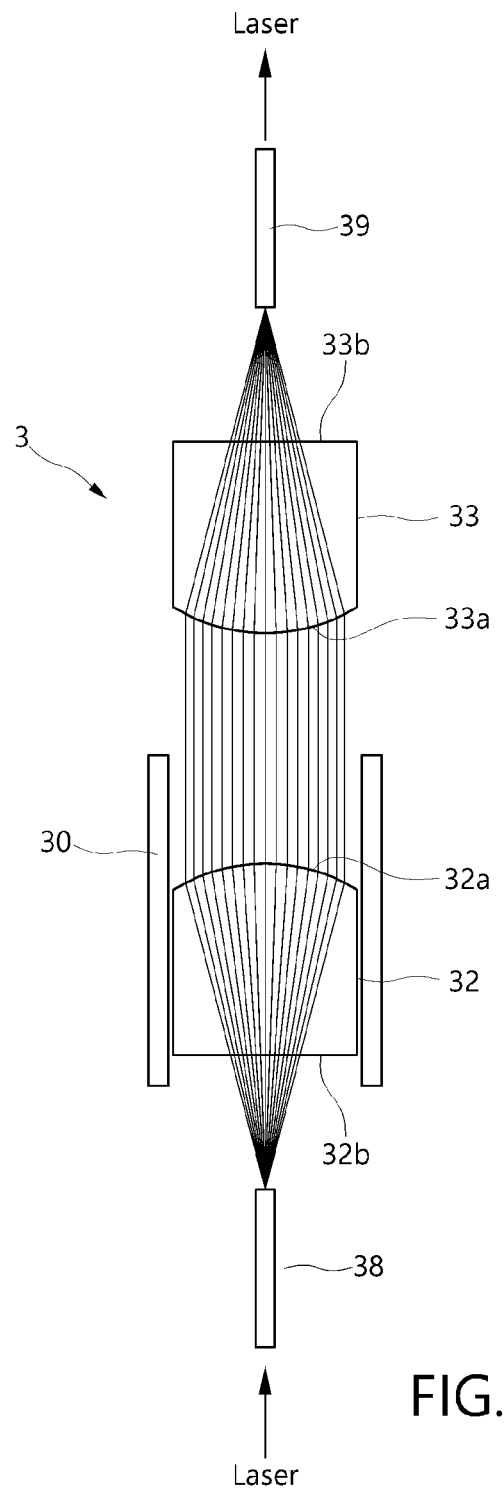

Meanwhile, referring to FIGS. 6 and 7, the second coupling lens 32 may be coupled to the fixture 1 to be fixed, and the third coupling lens 33 may be coupled to the rotating body 2 to rotate. More specifically, the second coupling lens 32 may be disposed in the fixture 1 to convert a laser incident from the output end of the first optical fiber 38 into parallel light to emit, and the third coupling lens 33 may be coupled to the rotating body 2 to rotate.

In this case, as shown in FIG. 6, the hollow guide member 30 may have an upper end fixed to the rotating body 2 and a lower end disposed to be relatively rotatable to the fixture 1. In addition, the third coupling lens 33 may be inserted and fixed to the hollow guide member 30.

Meanwhile, as shown in FIG. 7, the hollow guide member 30 may have a lower end fixed to the fixture 1, and an upper end thereof may be disposed to be relatively rotatable to the rotating body 2. In addition, the third coupling lens 33 may be inserted and fixed to the hollow guide member 30.

Figure 8:
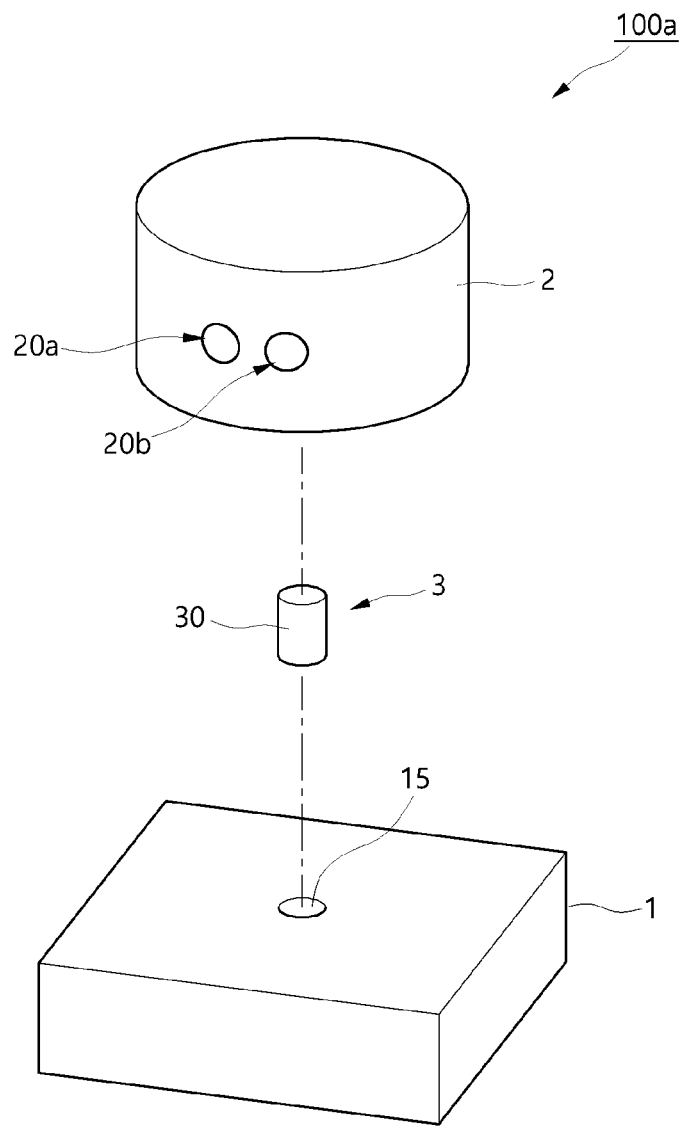
FIG. 8 is a schematic side view of the configuration of a lidar apparatus according to another exemplary embodiment of the present disclosure.
Figure 9:
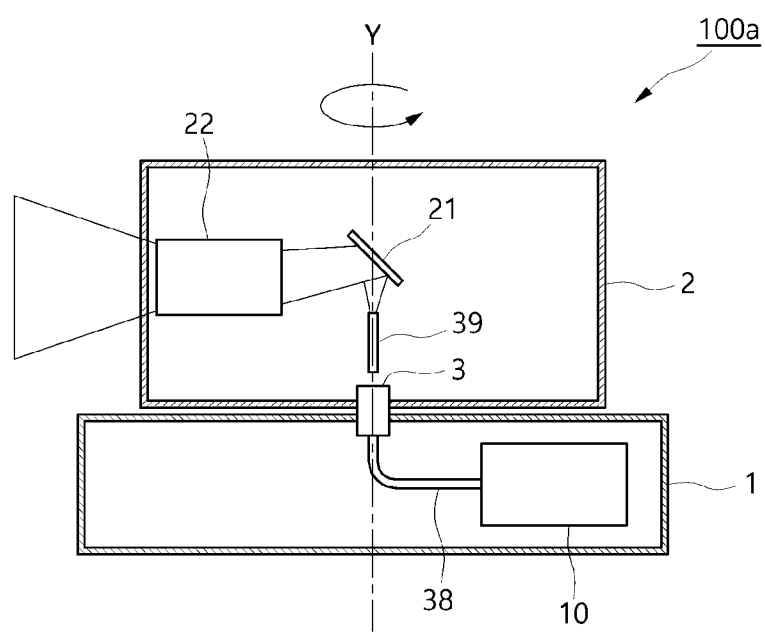
FIG. 9 is an exploded perspective view of a lidar apparatus according to another exemplary embodiment of the present disclosure.
Figure 10:
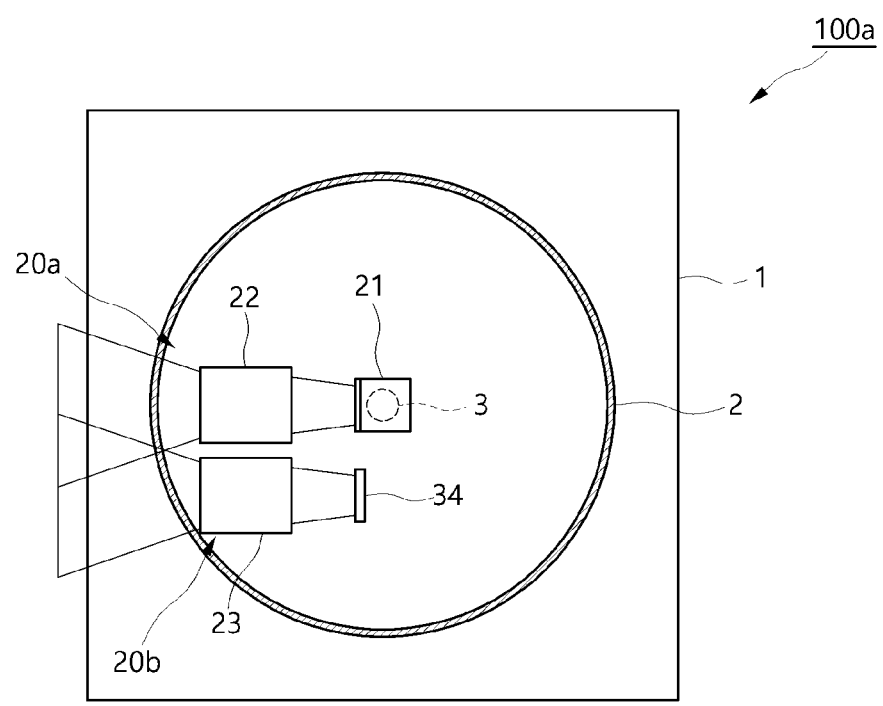
FIG. 10 is a schematic plan view of the configuration of a lidar apparatus according to another exemplary embodiment of the present disclosure.

FIGS. 8 to 10 show a lidar apparatus 100 according to another exemplary embodiment of the present disclosure.

Referring to FIGS. 8 to 10, in another exemplary embodiment of the present disclosure, the laser transmitting module 20a and the laser receiving module 20b may be disposed adjacent to each other left and right in the rotating body 2. Since other configurations besides the above are the same, detailed description thereof will be omitted.

Figure 11:
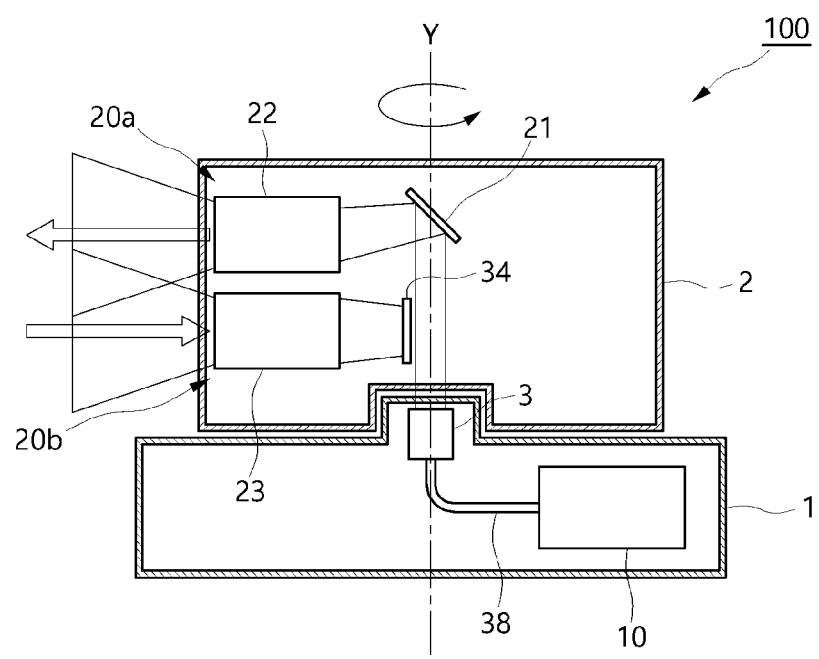
FIG. 11 is a schematic side view of the configuration of a lidar apparatus according to still another exemplary embodiment of the present disclosure.
Figure 12:
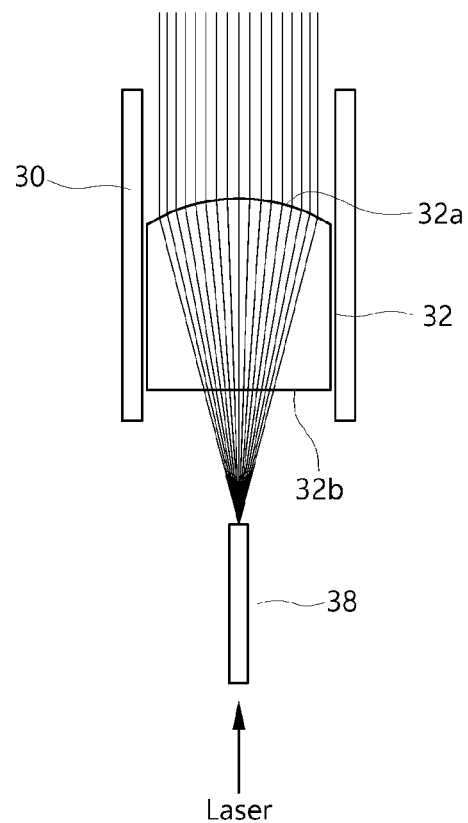
FIG. 12 is a view showing a light guide unit of a lidar apparatus according to still another exemplary embodiment of the present disclosure.

FIG. 11 is a schematic side view of the configuration of a lidar apparatus according to still another exemplary embodiment of the present disclosure, and FIG. 12 is a view showing a light guide unit of a lidar apparatus according to still another exemplary embodiment of the present disclosure.

Referring to FIGS. 11 and 12, in still another exemplary embodiment of the present disclosure, a first optical fiber 38 for transmitting a laser generated by a laser generating source 10 towards a light guide unit 3 is disposed in a fixture 1, and the light guide unit 3 may guide a laser output from the first optical fiber 38 to a laser transmitting module 20a.

The laser passing through the light guide unit 3 may be output towards the laser transmitting module 20a. In other words, the laser that has passed through the light guide unit 3 may be incident towards the reflective mirror 21 of the laser transmitting module 20a without passing through another optical fiber.

More specifically, the light guide unit 3 may include a second coupling lens 32 provided with an incident surface 32b and an exit surface 33a at both ends to convert a laser incident from an output end of the first optical fiber 38 into parallel light to emit.

In addition, the light guide unit 3 may be fixedly disposed in the fixture 1. For example, the hollow guide member 30 may be fixedly disposed in the fixture 1, and the second coupling lens 32 may be inserted and disposed in the hollow of the hollow guide member 30.

In this case, along the rotation axis Y, the upper surface of the fixture 1 and the lower surface of the rotating body 2 may be formed with through holes for the proceeding of a laser. In addition, a certain area of the upper part of the fixture 1 may be formed to protrude around the rotation axis Y, and a certain area of the lower part of the rotation body 2 may be formed to be recessed such that the protruding part of the fixture 1 may be disposed rotatably in the recessed portion of the rotating body 2.

Meanwhile, the exemplary embodiments of the present disclosure may additionally include a driving unit for providing power for rotating and displacing the rotating body 2 from the reference position with respect to the fixture 1 by 360 degrees.

The driving unit may include an actuator separately provided in the inner space or outside of the fixture 1 to apply a rotational driving force to the rotating body 2. For example, the actuator may be a motor or cylinder that directly or indirectly transmits a driving force to the rotating body 2 or the hollow guide member 30.

Figure 13:
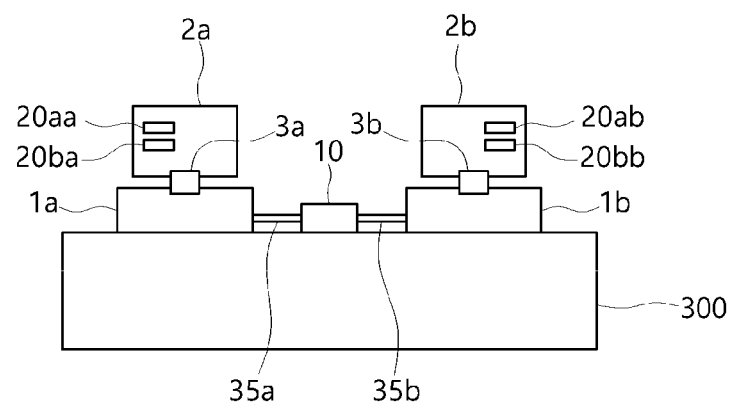
FIG. 13 is a diagram illustrating the configuration of a lidar system according to an exemplary embodiment of the present disclosure.

FIG. 13 is a diagram illustrating the configuration of a lidar system according to an exemplary embodiment of the present disclosure.

Referring to FIG. 13, the lidar system according to an exemplary embodiment of the present disclosure includes an installation object 300, a laser generating source 10 fixed on the installation object 300 to generate a laser, a first fixture 1a fixedly disposed on the installation object 300, a first rotating body 2a disposed to rotate about a rotation axis with respect to the first fixture 1a, and provided with a first laser transmitting module 20aa for transmitting a laser generated by the laser generating source 10 to the outside and a first laser receiving module 20ba for receiving a laser reflected from an external object, and a first light guide unit 3a disposed on the rotation axis to transmit a laser generated by the laser generating source from the first fixture 1a to the first rotating body 2a.

For example, the installation object 300 may be a vehicle. That is, the lidar system according to an exemplary embodiment of the present disclosure may be applied to a vehicle to perform detection for driver assistance, autonomous driving, and the like.

In addition, the lidar system according to an exemplary embodiment of the present disclosure further includes a second fixture 1b spaced apart from the first fixture 1a and fixedly disposed on the installation object 300, a second rotating body 2b disposed to rotate about a rotation axis with respect to the second fixture 1b, and provided with a second laser transmitting module 20ab for transmitting a laser generated by the laser generating source to the outside and a second laser receiving module 20bb for receiving a laser reflected from an external object, and a second light guide unit 3b disposed on the rotation axis to transmit a laser generated by the laser generating source from the second fixture 1b to the second rotating body 2b.

Meanwhile, a laser generated by the laser generating source 10 may be transmitted to the first fixture 1a through a third optical fiber 35a, and may be transmitted to the second fixture 1b through a fourth optical fiber 35b.

As such, in the lidar system according to an exemplary embodiment of the present disclosure, one laser generating source 10 may simultaneously supply lasers to a plurality of laser transmitting modules. Through this, the size of the system may be reduced, and the efficiency may be improved.

As described above, according to the exemplary embodiments of the present disclosure, omnidirectional scanning is possible by rotating a rotating body having laser transmitting/receiving modules by 360 degrees about a rotation axis with respect to a fixture, and since a laser generated by a fixed laser generating source may be transmitted to a rotating body without causing twisting of an optical fiber through a light guide unit, the detection range and capability of the lidar may be increased.

In addition, according to the exemplary embodiments of the present disclosure, alignment of the laser transmitting/receiving modules may be facilitated, and the number of applied parts may be reduced, thereby increasing price competitiveness of the lidar apparatus.

In addition, according to the exemplary embodiments of the present disclosure, both safety and performance may be satisfied by using a laser light source having high power while satisfying safety for the human body.

While embodiments of the present disclosure have been described above, the scope of the present disclosure is not limited to the disclosed embodiments. Those skilled in the art of the present disclosure can readily suggest another embodiment by adding, modifying, deleting, or adding components without departing from the scope of the present disclosure, but the suggested embodiment is construed as being within the scope of the present disclosure.

What is claimed is:

1. A lidar apparatus, comprising:
a laser generating source for generating a laser;
a fixture fixedly disposed on an installation object;
a rotating body disposed to rotate about a rotation axis with respect to the fixture, and provided with a laser transmitting module for transmitting a laser generated by the laser generating source to the outside and a laser receiving module for receiving a laser reflected from an external object; and
a light guide unit disposed on the rotation axis to transmit a laser generated by the laser generating source from the fixture to the rotating body
wherein a first optical fiber for transmitting a laser generated by the laser generating source towards the light guide unit is disposed in the fixture,
wherein a second optical fiber for transmitting a laser passing through the light guide unit towards the laser transmitting module is disposed in the rotating body, and
wherein the light guide unit guides a laser output from the first optical fiber to an input of the second optical fiber.

2. The lidar apparatus of claim 1, wherein the laser generating source comprises a fiber laser.

3. The lidar apparatus of claim 1, wherein the laser generating source generates a laser having a wavelength of 1,500 nm to 1,600 nm.

4. The lidar apparatus of claim 1, wherein the laser transmitting module comprises a reflective mirror for converting a vertical laser transmitted in a vertical direction along the rotation axis into a horizontal laser, and a transmission lens for transmitting a horizontal laser whose direction is converted in the reflective mirror to the outside.

5. The lidar apparatus of claim 1, wherein the laser receiving module comprises a receiving lens for receiving a laser reflected and returned from the external object, and a detector for condensing and detecting a laser received from the receiving lens.

6. The lidar apparatus of claim 5, wherein the detector comprises an array detector.

7. The lidar apparatus of claim 6, wherein the detector comprises a multi-channel array having 16 channels or more.

8. The lidar apparatus of claim 1, wherein the light guide unit comprises a first coupling lens that is provided at both ends with an incident surface for converting an incident laser emitted from an output end of the first optical fiber into parallel light, and an exit surface for condensing the parallel light to emit to an input end of the second optical fiber.

9. The lidar apparatus of claim 8, wherein the first coupling lens is coupled to the fixture to be fixed or coupled to the rotating body to rotate.

10. The lidar apparatus of claim 1, wherein the light guide unit comprises a second coupling lens provided with an incident surface at a first end and an exit surface at a second end to convert a laser incident from the output end of the first optical fiber into parallel light to emit, and a third coupling lens provided with an incident surface at the first end and an exit surface at the second end to condense parallel light incident from the second coupling lens to emit towards the second optical fiber.

11. The lidar apparatus of claim 10, wherein the second coupling lens is coupled to the fixture to be fixed, and the third coupling lens is coupled to the rotating body to rotate.

12. The lidar apparatus of claim 10, wherein the second coupling lens and the third coupling lens are fixed to the fixture.

13. The lidar apparatus of claim 1, wherein the light guide unit comprises a second coupling lens provided with an incident surface at a first end and an exit surface at a second end to convert a laser incident from an output end of the first optical fiber into parallel light to emit.

14. The lidar apparatus of claim 13, wherein the second coupling lens is fixed to the fixture.

15. The lidar apparatus of claim 1, wherein the light guide unit is fixed to any one of the fixture or the rotating body.

16. A lidar system, comprising:
an installation object;
a laser generating source fixed on the installation object to generate a laser;
a first fixture fixedly disposed on the installation object;
a first rotating body disposed to rotate about a rotation axis with respect to the first fixture, and provided with a first laser transmitting module for transmitting a laser generated by the laser generating source to the outside and a first laser receiving module for receiving a laser reflected from an external object; and a first light guide unit disposed on the rotation axis to transmit a laser generated by the laser generating source from the first fixture to the first rotating body wherein a first optical fiber for transmitting a laser generated by the laser generating source towards the light guide unit is disposed in the fixture, wherein a second optical fiber for transmitting a laser passing through the light guide unit towards the laser transmitting module is disposed in the rotating body, and wherein the light guide unit guides a laser output from the first optical fiber to an input of the second optical fiber.

17. The lidar system of claim 16, wherein the installation object is a vehicle.

18. The lidar system of claim 16, further comprising:

a second fixture spaced apart from the first fixture and fixedly disposed on the installation object;

a second rotating body disposed to rotate about a rotation axis with respect to the second fixture, and provided with a second laser transmitting module for transmitting a laser generated by the laser generating source to the outside and a second laser receiving module for receiving a laser reflected from an external object; and a second light guide unit disposed on the rotation axis to transmit a laser generated by the laser generating source from the second fixture to the second rotating body.

* * * * *